(12) United States Patent
Sato

(10) Patent No.: US 9,034,779 B2
(45) Date of Patent: May 19, 2015

(54) OPTICAL GLASS

(75) Inventor: Fumio Sato, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 67 days.

(21) Appl. No.: 13/822,298

(22) PCT Filed: Jan. 10, 2012

(86) PCT No.: PCT/JP2012/050242
§ 371 (c)(1),
(2), (4) Date: Mar. 12, 2013

(87) PCT Pub. No.: WO2012/102068
PCT Pub. Date: Aug. 2, 2012

(65) Prior Publication Data
US 2013/0172168 A1    Jul. 4, 2013

(30) Foreign Application Priority Data
Jan. 26, 2011    (JP) .................. 2011-013527

(51) Int. Cl.
*C03C 3/062* (2006.01)
*C03C 3/097* (2006.01)
*C03C 3/064* (2006.01)

(52) U.S. Cl.
CPC ................ *C03C 3/062* (2013.01); *C03C 3/097* (2013.01); *C03C 3/064* (2013.01)

(58) Field of Classification Search
CPC ................................ C03C 3/062; C03C 3/097
USPC ...................................... 501/63, 73
See application file for complete search history.

(56) References Cited

U.S. PATENT DOCUMENTS

| | | | |
|---|---|---|---|
| 4,526,874 A * | 7/1985 | Grabowski geb. Marszalek et al. ............... | 501/77 |
| 4,734,389 A * | 3/1988 | Grabowski et al. ............. | 501/73 |
| 4,996,173 A * | 2/1991 | Tachiwana ...................... | 501/73 |
| 6,828,265 B2 * | 12/2004 | Uehara ........................... | 501/73 |
| 7,528,083 B2 * | 5/2009 | Shimizu et al. ................. | 501/73 |
| 7,598,192 B2 * | 10/2009 | Wolff et al. ..................... | 501/77 |
| 2003/0191008 A1 | 10/2003 | Uehara | |
| 2005/0162758 A1* | 7/2005 | Tanaka .......................... | 359/811 |
| 2008/0139376 A1 | 6/2008 | Doehring et al. | |
| 2008/0231972 A1* | 9/2008 | Hachitani et al. ............. | 359/809 |
| 2008/0254965 A1* | 10/2008 | Ishioka .......................... | 501/64 |
| 2008/0254966 A1* | 10/2008 | Tomoe et al. .................. | 501/73 |
| 2008/0287280 A1* | 11/2008 | Onoda et al. .................. | 501/78 |
| 2009/0139268 A1* | 6/2009 | Fujiwara et al. ............... | 65/404 |
| 2009/0197755 A1 | 8/2009 | Uehara | |
| 2009/0314033 A1* | 12/2009 | Zou et al. ....................... | 65/60.1 |
| 2010/0317507 A1* | 12/2010 | Zou et al. ....................... | 501/77 |
| 2011/0245063 A1* | 10/2011 | Takazawa ...................... | 501/79 |

FOREIGN PATENT DOCUMENTS

| | | |
|---|---|---|
| CN | 1576254 A | 2/2005 |
| CN | 1772671 A | 5/2006 |
| JP | 2001-342035 A | 12/2001 |
| JP | 2003-252646 A | 9/2003 |
| JP | 2004-161598 A | 6/2004 |
| JP | 2009-179538 A | 8/2009 |
| JP | 2010-083703 A | 4/2010 |

OTHER PUBLICATIONS

English translation of Official Communication issued in corresponding International Application PCT/JP2012/050242, mailed on Aug. 8, 2013.
Official Communication issued in International Patent Application No. PCT/JP2012/050242, mailed on Apr. 17, 2012.
Official Communication issued in corresponding Chinese Patent Application No. 201280002303.6, mailed on Aug. 4, 2014.

* cited by examiner

*Primary Examiner* — Anthony J Green
*Assistant Examiner* — Elizabeth A Bolden
(74) *Attorney, Agent, or Firm* — Keating & Bennett, LLP

(57) ABSTRACT

Provided is an optical glass that has desired optical properties, superior resistance to devitrification, and superior mass productivity. An optical glass is made of a $SiO_2$—$Nb_2O_5$—$TiO_2$-based glass having a refractive index (nd) of 1.75 to 1.95 and an Abbe's number (vd) of 15 to 35 and has an operation temperature range ($\Delta T$=(temperature at $10^{0.5}$ poise)−(liquidus temperature)) of 20° C. or more. The optical glass preferably contains, in percent by mass, 15% to 45% $SiO_2$, 15% to 40% (but excluding 40%) $Nb_2O_5$ and 1% to 30% $TiO_2$ as glass components.

11 Claims, No Drawings

OPTICAL GLASS

TECHNICAL FIELD

This invention relates to optical glasses suitable as optical lenses for digital cameras and video cameras or as lenses for optical communication.

BACKGROUND ART

In recent years, performances of digital cameras and video cameras have increasingly been enhanced and, more specifically, their miniaturization is becoming greater and greater and their magnification and definition are becoming higher and higher. To achieve these enhanced performances, optical lens glasses used for digital cameras and video cameras have been increasingly required to have properties, such as high refractive index, high dispersion, and anomalous dispersion.

An example of glasses proposed which meets the above properties is a $SiO_2$—$Nb_2O_5$-based glass having a refractive index (nd) of 1.78 or more and an Abbe's number (vd) of 30 or less (see, for example, Patent Literature 1). This glass can be used as a lens for optical communication by taking advantage of its properties, including high refractive index and high weatherability.

Known methods for producing an optical lens used for a digital camera, a video camera or the like includes a method of first molding a molten glass into an ingot, cutting the ingot into a glass material of appropriate size, polishing the glass material, and then press-molding it; and a method of forming a molten glass into a glass material by dropping a molten glass from a nozzle tip and forming it in a droplet shape, i.e., by so-called droplet forming, and then press-molding the formed glass material following or without polishing of the formed glass material.

CITATION LIST

Patent Literature

Patent Literature 1: JP-A-2009-179538

SUMMARY OF INVENTION

Technical Problem

The conventional $SiO_2$—$Nb_2O_5$-based glass has a high degree of devitrification and therefore tends to have poor mass productivity. Particularly, it presents a problem of difficulty in producing a glass material by droplet forming.

In view of the above problem, an object of the present invention is to provide an optical glass that has desired optical properties, superior resistance to devitrification, and superior mass productivity.

Solution to Problem

A first optical glass according to the present invention is made of a $SiO_2$—$Nb_2O_5$—$TiO_2$-based glass having a refractive index (nd) of 1.75 to 1.95 and an Abbe's number (vd) of 15 to 35 and has an operation temperature range (ΔT=(temperature at $10^{0.5}$ poise)−(liquidus temperature)) of 20° C. or more.

Studies of the Inventor have revealed that occurrence of devitrification in $SiO_2$—$Nb_2O_5$-based glasses is attributed mainly to the glasses containing a large amount of $Nb_2O_5$ which is a component for increasing the refractive index and dispersion. Therefore, it has been found that with the use of a $SiO_2$—$Nb_2O_5$—$TiO_2$-based glass in which part of $Nb_2O_5$ in a $SiO_2$—$Nb_2O_5$-based glass is replaced with $TiO_2$, devitrification can be reduced without decreasing the refractive index and dispersion so much. In addition, the use of a $SiO_2$—$Nb_2O_5$—$TiO_2$-based glass enables increase in weatherability, so that degradation in physical properties and surface alternation will be less likely to occur during the production process and the use of the product.

For example, in producing a glass material by droplet forming, a molten glass is dropped from a nozzle tip, which requires that the molten glass has a certain degree of viscosity. More specifically, if a molten glass of low viscosity is dropped, it takes the form of a continuous flow and cannot form droplets. Therefore, to achieve the formation of droplets, the molten glass must have a glass viscosity of about $10^{0.5}$ poise or more, for example. However, the conventional $SiO_2$—$Nb_2O_5$-based glass has the problem of ease of devitrification at a high viscosity of about $10^{0.5}$ poise or more. In contrast, the optical glass of the present invention exerts the effect of enabling suitable implementation of forming, particularly droplet forming, since its operation temperature range is 20° C. or more.

Note that the term "$SiO_2$—$Nb_2O_5$—$TiO_2$-based glass" used herein refers to a glass containing $SiO_2$, $Nb_2O_5$, and $TiO_2$ as essential components.

Secondly, the first optical glass of the present invention preferably contains, in percent by mass, 15% to 45% $SiO_2$, 15% to 40% (but excluding 40%) $Nb_2O_5$ and 1% to 30% $TiO_2$ as glass components.

Thirdly, the first optical glass of the present invention preferably further contains, in percent by mass, 0% to 15% $Li_2O$ and 0% to 20% $Na_2O$ as glass components.

Fourthly, the first optical glass of the present invention preferably further contains, in percent by mass, 0% to 2% $K_2O$, 0% to 20% (but excluding 20%) $R_2O$ (where R represents Li, Na or K), and 0% to 2% WO (where R' represents Mg, Ca, Sr or Ba) as glass components and is preferably substantially free of PbO, $As_2O_3$, $Cs_2O$, $GeO_2$, and $Bi_2O_3$.

A second optical glass according to the present invention contains, in percent by mass, 15% to 45% $SiO_2$, 15% to 40% (but excluding 40%) $Nb_2O_5$, 1% to 30% $TiO_2$, 0% to 15% $Li_2O$, 0% to 20% $Na_2O$, 0% to 2% $K_2O$, 0% to 20% (but excluding 20%) $R_2O$ (where R represents Li, Na or K), and 0% to 2% WO (where R' represents Mg, Ca, Sr or Ba) as glass components and is substantially free of PbO, $As_2O_3$, $Cs_2O$, $GeO_2$, and $Bi_2O_3$.

Sixthly, the optical glass of the present invention is preferably for use in press molding.

Seventhly, the optical glass of the present invention is preferably used as a lens for optical communication.

DESCRIPTION OF EMBODIMENTS

An optical glass of the present invention is made of a $SiO_2$—$Nb_2O_5$—$TiO_2$-based glass having a refractive index (nd) of 1.75 to 1.95 and an Abbe's number (vd) of 15 to 35 and has an operation temperature range (ΔT=(temperature at $10^{0.5}$ poise)−(liquidus temperature)) of 20° C. or more. The reasons why the present invention defines various properties as above are given below.

For example, when the optical glass is used as a lens, the lens can be more reduced in thickness as the refractive index is increased, which is advantageous for size reduction of an optical device. Therefore, the refractive index of the optical glass of the present invention is preferably not less than 1.75, more preferably not less than 1.765, still more preferably not less than 1.775, yet more preferably not less than 1.785, and particularly preferably not less than 1.80. Meanwhile, in order to increase the refractive index of the glass, it is necessary to increase the amount of component making the glass unstable, such as $Nb_2O_5$. Therefore, the upper limit of the refractive index must be defined in consideration of the stability of the glass. Specifically, the refractive index of the optical glass of the present invention is preferably not more than 1.95 and particularly preferably not more than 1.90.

The Abbe's number of the optical glass of the present invention is preferably not more than 35, more preferably not more than 30, still more preferably not more than 26, and particularly preferably not more than 24 in order to achieve a high dispersion property. Although smaller Abbe's number is desirable because of advantage for reduction of chromatic aberration in combination with another lens in an optical design, this is likely to decrease the refractive index or destabilize the glass. Therefore, the Abbe's number of the optical glass of the present invention is preferably not less than 20, more preferably not less than 21, and particularly preferably not less than 22.

When the operation temperature range is not less than 20° C., or not less than 30° C., or particularly not less than 40° C., a preform glass can be produced with a high yield. Larger operation temperature range is better and no particular limitation is placed on the upper limit of the operation temperature range. However, actually, the operation temperature range is preferably not more than 300° C. and particularly preferably not more than 200° C. Note that the temperature equivalent to $10^{0.5}$ poise corresponds to the forming temperature in the droplet forming method. The droplet forming is known as one of forming methods whereby glass is most likely to be devitrified. Therefore, it can be considered that if the difference $\Delta T$ between the temperature at $10^{0.5}$ poise and the liquidus temperature is not less than 20° C., glass forming is possible without the occurrence of devitrification in almost all of forming methods including the droplet forming method.

No particular limitation is placed on the composition of the $SiO_2$—$Nb_2O_5$—$TiO_2$-based glass so long as the glass is one meeting all of the above properties. Note that in order to obtain a $SiO_2$—$Nb_2O_5$—$TiO_2$-based glass having the above properties, an appropriate composition should be selected in consideration of the following points.

To increase the refractive index and reduce the Abbe's number in the $SiO_2$—$Nb_2O_5$—$TiO_2$-based glass, the contents of $Nb_2O_5$ and $TiO_2$ should be increased. Besides these components, addition of $Ta_2O_5$, $ZrO_2$, $Y_2O_3$, $WO_3$ or the like can increase the refractive index and reduce the Abbe's number.

Furthermore, to increase the operation temperature range means to reduce the tendency of glass to devitrify. Therefore, in the $SiO_2$—$Nb_2O_5$—$TiO_2$-based glass, the contents of $SiO_2$, $B_2O_3$, and $TiO_2$ should be increased. Besides these components, addition of $ZrO_2$, $Y_2O_3$, $WO_3$ or the like can increase the operation temperature range.

Specifically, the optical glass of the present invention preferably contains, in percent by mass, 15% to 45% $SiO_2$, 15% to 40% (but excluding 40%) $Nb_2O_5$ and 1% to 30% $TiO_2$ as glass components. Within the above composition range, the properties of a refractive index of 1.75 to 1.95, an Abbe's number of 15 to 35, and an operation temperature range of 20° C. or more can be easily achieved.

The reasons why the composition range is defined as above are described below. Note that "%" used in the following description of the glass composition means "% by mass" unless otherwise stated.

$SiO_2$ is a component for forming the glass network and a component having the effects of increasing the resistance to devitrification and widening the operation temperature range. $SiO_2$ also has the effect of increasing the weatherability. The content of $SiO_2$ is preferably 15% to 45%, more preferably 20% to 40%, and particularly preferably 25% to 37%. If the content of $SiO_2$ is above 45%, there will be a tendency to significantly decrease the refractive index and a tendency to make the glass transition point excessively high (for example, above 700° C.) On the other hand, if the content of $SiO_2$ is below 15%, there will be a tendency to make vitrification difficult.

$Nb_2O_5$ is a component for increasing the refractive index. The content of $Nb_2O_5$ is preferably 15% to 40% (but excluding 40%), more preferably 20% to 39.5%, and particularly preferably 25% to 39%. If the content of $Nb_2O_5$ is 40% or more, there will be a tendency to raise the liquidus temperature to decrease the stability of the glass. On the other hand, if the content of $Nb_2O_5$ is below 15%, a refractive index of 1.75 or more will become difficult to achieve.

$TiO_2$ is a component for increasing the refractive index. In addition, $TiO_2$ forms the glass as an intermediate oxide and, therefore, has the effects of increasing the resistance to devitrification and increasing the chemical durability. The content of $TiO_2$ is preferably 1% to 30%, more preferably 5% to 25%, and particularly preferably 10% to 20%. If the content of $TiO_2$ is above 30%, there will be, on the contrary, a strong tendency to cause devitrification and make vitrification difficult. On the other hand, if the content of $TiO_2$ is below 1%, the chemical durability will be likely to significantly decrease.

When, besides the above components, one or more alkali metal oxides, such as $Li_2O$, $Na_2O$, and $K_2O$, are added, a glass having a desired refractive index, a desired Abbe's number, and a desired operation temperature range can be more easily produced. These components are generally difficult to add into the $SiO_2$—$Nb_2O_5$-based glass because they are likely to degrade the weatherability. However, when the content of $Nb_2O_5$ is reduced (for example, to below 40%), a relatively large amount of these components can be contained in the glass, which makes it easy to design a low-softening-point glass.

$Li_2O$ is a component for reducing the phase separation to increase the stability of the glass. The content of $Li_2O$ is preferably 0% to 15%, more preferably 0.1% to 10%, and particularly preferably 0.5% to 5%. If the content of $Li_2O$ is above 15%, there will be a tendency to significantly decrease the weatherability and a tendency to decrease the refractive index.

$Na_2O$, like $Li_2O$, is a component for reducing the phase separation to increase the stability of the glass. The content of $Na_2O$ is preferably 0% to 20%, more preferably 0.1% to 18%, still more preferably 0.5% to 15%, and particularly preferably 1% to 14%. If the content of $Na_2O$ is above 20%, there will be a tendency to significantly decrease the weatherability and a tendency to decrease the refractive index.

$K_2O$, like $Li_2O$ and $Na_2O$, is a component for reducing the phase separation to increase the stability of the glass. The content of $K_2O$ is preferably 0% to 2%, more preferably 0.1% to 1%, and particularly preferably 0.2% to 0.5%. If the content of $K_2O$ is above 2%, there will be a tendency to significantly decrease the weatherability and a tendency to decrease the refractive index.

The total content of $Li_2O$, $Na_2O$, and $K_2O$ is preferably 0% to 20%, more preferably 0.1% to 18%, still more preferably 0.5% to 15%, and particularly preferably 1% to 14%. If the total content of these components is above 20%, there will be a tendency to significantly decrease the weatherability and a tendency to decrease the refractive index.

Furthermore, in addition to the above components, $ZrO_2$, $WO_3$, $B_2O_3$, ZnO, and/or $Ta_2O_5$ may be added.

$ZrO_2$ is a component for increasing the refractive index. In addition, $ZrO_2$ forms the glass as an intermediate oxide and, therefore, has the effects of increasing the resistance to devitrification and increasing the chemical durability. The content of $ZrO_2$ is preferably 0% to 15%, more preferably 0.5% to 10%, and particularly preferably 1% to 8%. If the content of $ZrO_2$ is above 15%, there will be, on the contrary, a strong tendency to cause devitrification and make vitrification difficult.

$WO_3$ is a component for increasing the refractive index. In addition, $WO_3$ forms the glass as an intermediate oxide and, therefore, has the effect of increasing the resistance to devitrification. The content of $WO_3$ is preferably 0% to 15%, more preferably 0.5% to 10%, and particularly preferably 1% to 8%. If the content of $WO_3$ is above 15%, there will be, on the contrary, a strong tendency to cause devitrification and make vitrification difficult. In addition, there will be a tendency to decrease the ultraviolet region transmittance and a tendency to increase the affinity to the pressing mold to make the glass easily fusion bond to the mold upon press molding.

$B_2O_3$ is a component for forming the glass network and has the effect of increasing the resistance to devitrification. $B_2O_3$ also has the effects of increasing the Abbe's number and decreasing the softening point. In addition, $B_2O_3$ also has the effect of preventing fusion bonding to the mold upon press molding. The content of $B_2O_3$ is preferably 0% to 30%, more preferably 1% to 20%, and particularly preferably 5% to 15%. If the content of $B_2O_3$ is above 30%, there will be a tendency to decrease the chemical durability of the glass and a tendency to significantly degrade the weatherability thereof.

ZnO is a component for increasing the refractive index and the chemical durability and decreasing the softening point. The content of ZnO is preferably 0% to 20%, more preferably 0.5% to 15%, and particularly preferably 1% to 10%. If the content of ZnO is above 20%, there will be, on the contrary, a strong tendency to cause devitrification and make vitrification difficult.

$Ta_2O_5$ has the effects of increasing the refractive index, increasing the chemical durability, and increasing the resistance to devitrification. The content of $Ta_2O_5$ is preferably 0% to 20%, more preferably 0.5% to 15%, and particularly preferably 1% to 10%. If the content of $Ta_2O_5$ is above 20%, there will be, on the contrary, a strong tendency to cause devitrification and make vitrification difficult. In addition, the cost will be likely to increase.

Various components other than the above components may be added. For example, $Sb_2O_3$ may be added as a fining agent or a decolorizing agent. To avoid excessive coloration of the glass, the content of $Sb_2O_3$ is preferably 1% or less.

Alkaline earth metal oxides, such as MgO, CaO, SrO, and BaO, significantly decrease the weatherability and significantly increase the liquidus temperature. Therefore, the content of these components is preferably 2% or less and particularly preferably 1% or less and, most preferably, none of them is contained in the glass.

PbO, $Cs_2O$, $As_2O_3$, $GeO_2$, and $Bi_2O_3$ have a large effect on the environment and cause concerns about coloration of the glass. Therefore, the glass is preferably substantially free of these components (specifically, the content of each component is preferably less than 0.1% by mass).

$La_2O_2$, $Ce_2O_2$, $Gd_2O_2$, and $Yb_2O_3$ are preferably not contained in the glass because they are likely to increase the cost.

Besides the previously-described properties, the optical glass of the present invention should preferably achieve a low glass transition point. Thus, fusion bonding of the glass to the mold upon press molding can be prevented to increase the mass productivity. In addition, as the glass transition point decreases, the glass components become less likely to volatilize during press molding, so that problems of decrease in molding accuracy and deterioration or contamination of the mold become less likely to occur. Specifically, the glass transition point of the optical glass of the present invention is preferably not higher than 630° C. and particularly preferably not higher than 600° C.

Next, a description will be given of a method for producing an optical lens used for a digital camera, a video camera or the like using the optical glass of the present invention.

First, glass raw materials mixed together to give a desired composition are melted into a molten glass. Next, the molten glass is dropped from a nozzle tip and formed in a droplet shape (droplet-formed) to obtain a glass material. Subsequently, the formed glass material is press-molded after or without being polished, resulting in a lens having a desired shape. Alternatively, instead of performing the droplet forming, a method may be employed in which the molten glass is molded into an ingot, the ingot is cut into a glass material of appropriate size, and the glass material is polished and then press-molded.

The optical lens produced from the optical glass of the present invention can also be used as a lens cap assembled with a metallic part.

EXAMPLES

Hereinafter, the present invention will be described in detail with reference to examples but is not at all limited to the examples.

Tables 1 to 3 show examples of the present invention (Samples Nos. 1 to 22) and comparative examples (Samples Nos. 23 and 24).

TABLE 1

| (% by mass) | 1 | 2 | 3 | 4 | 5 | 6 | 7 | 8 |
|---|---|---|---|---|---|---|---|---|
| $SiO_2$ | 24.4 | 29.6 | 28.1 | 27.1 | 27.8 | 28.0 | 28.4 | 28.2 |
| $B_2O_3$ | | | 1.7 | | | | | |
| ZnO | | | | | | 1.9 | | |
| $Li_2O$ | 4.7 | 5.7 | 5.7 | 5.5 | 5.6 | 5.7 | 6.4 | 5.7 |
| $Na_2O$ | 9.4 | 11.3 | 11.3 | 10.9 | 11.2 | 11.3 | 11.4 | 12.8 |
| $TiO_2$ | 6.5 | 13.9 | 13.8 | 13.3 | 13.6 | 13.8 | 14.0 | 13.9 |
| $Nb_2O_5$ | 39.0 | 39.5 | 39.4 | 37.9 | 38.9 | 39.3 | 39.8 | 39.4 |
| $ZrO_2$ | | | | | 2.9 | | | |
| $Ta_2O_5$ | 16.0 | | | | | | | |
| $WO_3$ | | | | 5.3 | | | | |
| $Sb_2O_3$ | 0.1 | | | | | | | |
| nd | 1.8482 | 1.8201 | 1.8206 | 1.8284 | 1.8300 | 1.8258 | 1.8219 | 1.8162 |
| νd | 25.1 | 25.4 | 25.4 | 25.1 | 25.3 | 25.3 | 25.5 | 25.7 |

TABLE 1-continued

| (% by mass) | 1 | 2 | 3 | 4 | 5 | 6 | 7 | 8 |
|---|---|---|---|---|---|---|---|---|
| Tg [° C.] | | 530 | 519 | 526 | 538 | 521 | 522 | 524 |
| Forming Temperature Tw [° C.] | | 1134 | 1098 | 1100 | 1118 | 1100 | 1086 | 1107 |
| Liquidus Temperature TL [° C.] | | 1015 | 1002 | 1015 | 1036 | 1031 | 1031 | 1056 |
| ⊿T [° C.] | | 119 | 96 | 85 | 82 | 69 | 55 | 51 |

TABLE 2

| (% by mass) | 9 | 10 | 11 | 12 | 13 | 14 | 15 | 16 |
|---|---|---|---|---|---|---|---|---|
| $SiO_2$ | 28.1 | 33.2 | 36.1 | 38.8 | 33.8 | 32.1 | 31.5 | 25.9 |
| $B_2O_3$ | | | | | | | | |
| ZnO | | | | | | | | |
| $Li_2O$ | 5.7 | 3.5 | 1.7 | | 1.7 | 1.7 | 1.7 | 5.2 |
| $Na_2O$ | 11.3 | 11.1 | 10.9 | 10.7 | 10.8 | 10.5 | 10.8 | 10.4 |
| $TiO_2$ | 15.7 | 13.6 | 13.3 | 13.1 | 16.0 | 13.7 | 18.5 | 12.7 |
| $Nb_2O_5$ | 39.2 | 38.6 | 38.0 | 37.4 | 37.7 | 36.7 | 37.5 | 36.2 |
| $ZrO_2$ | | | | | | 2.7 | | |
| $Ta_2O_5$ | | | | | | | | 9.6 |
| $WO_3$ | | | | | | 2.6 | | |
| $Sb_2O_3$ | | | | | 0.08 | 0.08 | 0.08 | |
| nd | 1.8337 | 1.8090 | 1.7959 | 1.7766 | 1.8201 | 1.8223 | 1.8438 | 1.8432 |
| vd | 24.7 | 25.2 | 24.9 | 24.4 | 23.8 | 24.1 | 22.8 | 24.7 |
| Tg [° C.] | 532 | | | | 582 | 576 | 579 | 544 |
| Forming Temperature Tw [° C.] | 1097 | | | | 1377 | 1349 | 1283 | 1165 |
| Liquidus Temperature TL [° C.] | 1019 | | | | 1071 | 1034 | 1114 | 1112 |
| ⊿T [° C.] | 78 | | | | 306 | 315 | 169 | 53 |

TABLE 3

| (% by mass) | 17 | 18 | 19 | 20 | 21 | 22 | 23 | 24 |
|---|---|---|---|---|---|---|---|---|
| $SiO_2$ | 34.2 | 27.2 | 30.3 | 26.1 | 27.4 | 25.0 | 25.0 | 32.5 |
| $B_2O_3$ | | | | | | | | |
| ZnO | | | | | | | | |
| $Li_2O$ | 2.7 | 1.5 | 6.8 | 6.3 | 2.4 | 1.4 | 5.0 | |
| $Na_2O$ | 8.8 | 9.5 | 9.3 | 8.5 | 7.7 | 8.9 | | 5.0 |
| $K_2O$ | | | | | | | 8.0 | 15.0 |
| BaO | | | | | | | 2.0 | 2.0 |
| $TiO_2$ | 16.1 | 14.0 | 14.1 | 12.8 | 14.2 | 13.1 | 8.0 | 15.0 |
| $Nb_2O_5$ | 38.2 | 39.0 | 39.5 | 36.6 | 39.4 | 31.0 | 50.0 | 30.0 |
| $ZrO_2$ | | | | | | | 2.0 | |
| $Ta_2O_5$ | | 8.8 | | 9.7 | 8.9 | 20.6 | | |
| $WO_3$ | | | | | | | | 0.5 |
| $Sb_2O_3$ | 0.08 | 0.08 | | | 0.08 | 0.08 | | |
| nd | 1.8263 | 1.8720 | 1.8242 | 1.8504 | 1.8789 | 1.8793 | 1.8838 | 1.7401 |
| vd | 23.6 | 22.2 | 25.5 | 24.6 | 22.2 | 22.4 | 26.6 | 27.9 |
| Tg [° C.] | 569 | 588 | | | | | 565 | 840 |
| Forming Temperature Tw [° C.] | 1325 | 1295 | | | 1277 | | 1310 | 1256 |
| Liquidus Temperature TL [° C.] | 1127 | 1098 | | | 1185 | | 1298 | 1198 |
| ⊿T [° C.] | 198 | 197 | | | 92 | | 12 | 58 |

The individual samples were prepared in the following manner: First, each set of glass raw materials were mixed together to give a corresponding composition shown in the above tables and melted at 1400° C. for two hours using a platinum crucible. After the melting, the molten glass was allowed to flow on a carbon plate and annealed and, then, glass samples suitable for the respective measurements were produced.

The resultant samples were measured in terms of refractive index (nd), Abbe's number (vd), glass transition point (Tg), forming temperature for droplet forming (Tw), liquidus temperature (Tl), and operation temperature range (ΔT). The results are shown in Tables 1 to 3.

The refractive index is represented by a value measured for the d-line (587.6 nm) of a helium lamp.

The Abbe's number was calculated using the refractive index at the d-line of the helium lamp and the respective refractive indices at the F-line (486.1 nm) and C-line (656.3 nm) of a hydrogen lamp and in accordance with the formula: Abbe's number={(nd−1)/(nF−nC)}.

The glass transition point was measured using a method of measuring the linear expansion coefficient of glass based on Japanese Industrial Standards R-3102 and ISO 7991.

The operation temperature range was determined in the following manner: First, the temperature equivalent to $10^{0.5}$ poise was determined by the platinum ball pulling-up method and the temperature determined was regarded as the forming temperature. On the other hand, the glass sample was ground and classified to obtain a 297-μm to 500-μm powder, the glass powder was put into a platinum boat, and the platinum boat containing the glass powder was held for 24 hours in an electric furnace having a temperature gradient and then cooled in air. The position of the glass powder in the boat where a devitrified substance precipitated was found with an optical microscope to thereby determine the liquidus temperature. The difference between the forming temperature and liquidus temperature obtained in the above manners was regarded as the operation temperature range.

As seen from Tables 1 to 3, Samples Nos. 1 to 22, examples of the present invention, have desired optical properties of a refractive index of 1.7766 to 1.8793 and an Abbe's number of 22.2 to 25.7. In addition, these samples have a low glass transition point of not higher than 588° C. and are therefore suitable for press molding. Furthermore, these samples have an operation temperature range of not less than 51° C., which shows that they are superior in workability.

On the other hand, Sample No. 23, a comparative example, has an operation temperature range as small as 12° C. and is therefore inferior in workability. Sample No. 24 has a refractive index as low as 1.7401, which does not fall within the desired range. In addition, this sample has a glass transition point as high as 840° C. and is therefore unsuitable for press molding.

INDUSTRIAL APPLICABILITY

The optical glass of the present invention can be used as a glass material for press molding and a glass material for polishing and is suitable for optical pickup lenses in various optical disc systems including CD, MD, DVD and the like; image pickup lenses in video cameras, digital cameras, and other general cameras; and lenses for optical communication.

The invention claimed is:

1. An optical glass made of a $SiO_2$—$Nb_2O_5$—$TiO_2$-based glass having a refractive index (nd) of 1.75 to 1.95 and an Abbe's number (vd) of 15 to 35, the optical glass containing, in percent by mass, 15% to 40% (but excluding 40%) $Nb_2O_5$, 1% to 18.5% $TiO_2$, and 0% to 1% R'O (where R' represents Mg, Ca, Sr, or Ba) as glass components, and having an operation temperature range (ΔT=(temperature at 100.5 poise)−(liquidus temperature)) of 20° C. or more, and in percent by mass, 0% to 2% $K_2O$, and 0% to 20% (but excluding 20%) $R_2O$ (where R represents Li, Na or K), as glass components and being substantially free of PbO, $As_2O_3$ $Cs_2O$ $GeO_2$ and $Bi_2O_3$.

2. The optical glass according to claim 1, further containing, in percent by mass, 15% to 45% $SiO_2$, as a glass component.

3. The optical glass according to claim 2, further containing, in percent by mass, 0% to 15% $Li_2O$ and 0% to less than 20% $Na_2O$ as glass components.

4. The optical glass according to claim 1, being for use in press molding.

5. The optical glass according to claim 1, being used as a lens for optical communication.

6. An optical lens defined by the optical glass according to claim 1.

7. A lens cap comprising:
the optical lens according to claim 6; and
a metallic part connected to the optical lens.

8. An optical glass containing, in percent by mass, 15% to 45% $SiO_2$, 15% to 40% (but excluding 40%) $Nb_2O_5$, 1% to 18.5% $TiO_2$, 0% to 15% $Li_2O$, 0% to less than 20% $Na_2O$, 0% to 2% $K_2O$, 0% to 20% (but excluding 20%) $R_2O$ (where R represents Li, Na or K), and 0% to 1% R'O (where R' represents Mg, Ca, Sr or Ba) as glass components and being substantially free of PbO, $As_2O_3$, $Cs_2O$, $GeO_2$, and $Bi_2O_3$.

9. The optical glass according to claim 8, being used as a lens for optical communication.

10. An optical lens defined by the optical glass according to claim 8.

11. A lens cap comprising:
the optical lens according to claim 10; and
a metallic part connected to the optical lens.

* * * * *